July 9, 1968     HIDEO MIYAKE     3,391,964

FOAMED PLASTIC SEAL FOR ENDLESS TRACK LINKS

Filed March 18, 1966

INVENTOR.
*HIDEO MIYAKE*
BY *Steinberg & Blake*
*attys.*

United States Patent Office 3,391,964
Patented July 9, 1968

3,391,964
FOAMED PLASTIC SEAL FOR ENDLESS TRACK LINKS
Hideo Miyake, Hirakata-shi, Osaka, Japan, assignor to Kabushiki Kaisha Komatsu, Seisakushi-Komatsu Mfg. Co., Ltd., Tokyo, Japan
Filed Mar. 18, 1966, Ser. No. 535,483
Claims priority, application Japan, Mar. 27, 1965, 40/23,756
4 Claims. (Cl. 305—11)

ABSTRACT OF THE DISCLOSURE

A sealed connected structure for interconnecting elements such as components of an endless vehicle track. The elements have mutually spaced overlapping portions respectively provided with coaxial bores passing therethrough. One of the overlapping portions carries a pin, and the other overlapping portion carries in its bore a bushing surrounding the pin. A sealing structure which includes an inner relatively soft, resilient, yieldable annular means surrounds and engages the pin, this latter resilient annular means having an inner surface directed toward an end of the bushing which extends into an annular recess of the one overlapping portion. This inner surface of the annular resilient means has bonded thereto a second annular means which is relatively hard and which engages the end of the bushing which is directed toward the resilient annular means to compress the resilient annular means and to transmit to the latter relative movement of the interconnected elements both axially and angularly one with respect to the other.

This invention relates to an improved hinge connection and more particularly to an improved means for preventing a link pitch from the elongation for such a connection of the endless track mechanism.

The present invention will have many applications but is especially useful for and will be disclosed herein as applied to the hinge joints of an endless track mechanism of the type commonly employed on crawler vehicles or endless tractors.

In a crawler for such a vehicle as tractors or bulldozers, in accordance with the prior art, the endless track mechanism usually comprises a plurality of ground engaging track shoes each of which is secured to a pair of spaced track links pivotally connected to adjacent pairs of track links to form an endless chain. In the endless track chain, a pin is pressed into a bore formed in a link so as to secure the former on the latter firmly. A bushing is pressed into a bore formed in the adjacent link so as to secure the former on the latter firmly. A hinge connection is composed of such a pin inserted into such a bushing. The track chain thus constructed is trained about suitable guiding rollers and driving sprocket to provide a rail surface for the supporting track rollers to ride. Since there are some rotations of the track chain on the driving sprocket and the guiding rollers when they are engaged with each other, it is necessary to provide suitable clearances between the link and the bushing and between the bushing and the pin so as to adapt the link to be held rotatable on the bushing and to adapt the bushing to be held rotatable on the pin. In addition, it is also necessary thereby to adapt the link to be held somewhat axially slidably on the bushing and to adapt the bushing to be held somewhat axially slidably on the pin.

In the track chain constructed as above in accordance with the prior art, the pin and the bushing are negatively prevented from abrasion by means of quenching their rotating and sliding surfaces so as to provide the case hardening. The track mechanism is subjected, however, to extremely heavy duty in an environment of a particularly abrasive nature. The clearance between the bushing and the pin is apt to be intruded by fine particles of mud and sand, sea-water and muddy water. Such fine particles act on the sliding surfaces as abrasive material so as to accelerate abrasion and corrosion, and as a result, the pitch of the track chain is elongated rapidly so that the bushings are brought into an abnormal engagement with the driving sprocket whereby, in turn, rapid deterioration of the sprocket and the bushings is caused.

One object of this invention is to provide a hinge connection for the endless track chain which is prevented from the rapid elongation by virtue of a rational, effective and durable seal provided in the connection.

Another object of this invention is to provide crawler vehicles and endless tractors which may be satisfactorily operated for a very considerable length of time without requiring any repairs or attention.

Briefly stated in accordance with one aspect of this invention, there is provided a hinge connection comprising two parts connected for relative swing movement by a pin, and a spacing seal embracing the pin to space the two parts axially along the pin. The spacing seal comprises a resilient member made of a foamed plastics and a washer made of an abrasion resisting synthetic rubber material adhered with the resilient member.

The invention will be better understood and other objects and additional advantages of the invention will become apparent upon perusal of the following description taken in connection with the drawings, in which.

Figure 1:
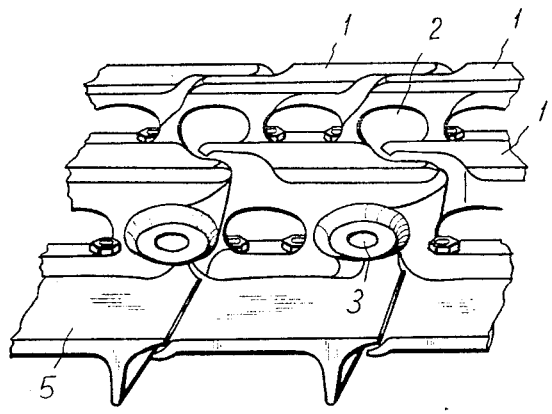
FIG. 1 is a perspective view of an endless track mechanism with parts broken away in which the hinge connection embodying this invention is provided.

Referring more particularly to the drawings, the preferred embodiment of this invention will now be described; however, this description will be understood to be illustrative of the invention and not as limiting it to the particular construction shown and described. There is a hinge connection comprising a pin 3 pressed into a bore formed in a link 1 so as to fix the former on the latter and a bushing 2 pressed into a bore formed in the adjacent link 1 so as to fix the former on the latter. There is a shoulder 8 in the inside surface of the first-named bore so that the bore is expanded and a circular recess embracing the pin 3 is formed which is adapted to receive the extended end 7 of the bushing 2 with a circumferential clearance. A resilient member 11 made of a foamed plastics such as urethane rubber is placed in the recess and a washer 12 made of an abrasion resisting synthetic rubber such as hard urethane rubber is adhered with the opposite end of the resilient member 11 to the shoulder 8. It is preferred that the foamed urethane rubber has a specific gravity of a matter of 0.25 to 0.45 and the hard urethane rubber has a shore hardness of a matter of 0.25 to 0.45. The resilient member 11 and the washer 12 constitute a seal 6. The seal 6 is pressed into the position between the shoulder 8 and the extended end 7 of the bushing 2 in such a manner that it is closely contacted with the shoulder 8 and the bushing 2 but it is somewhat deformable when the bushing 2 is rotated on the pin 3. Since the rotation of the bushing 2 on the pin 3 is very small, it is possible to absorb the rotation by the resilient member 11. It is also possible to absorb the axial sliding motion of the bushing 2 on the pin 3 by the resilience of the resilient member 11. In any case the clearance between the bushing 2 and the pin 3 is prevented from the intrusion of fine particles of an abrasive material so that the hinge connection is prevented from abrasion and corrosion whereby, in turn, the endless track chain is prevented from the elongation. By virtue of the resilience of the seal 6 the hinge connection is very durable.

Figure 2:
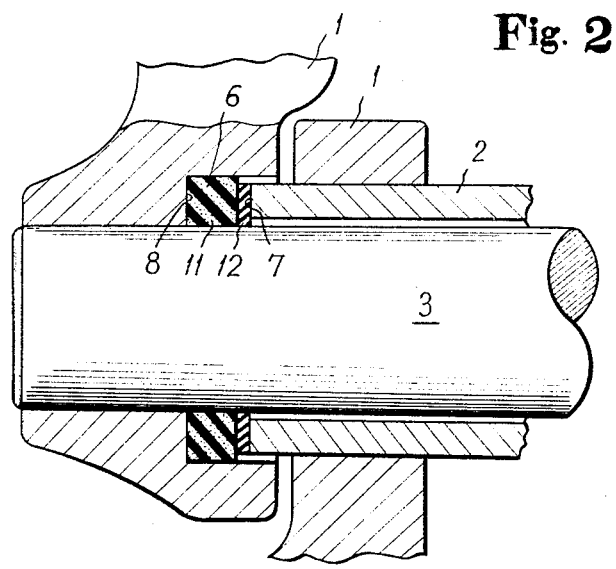
FIG. 2 is an enlarged fragmentary view in section of the hinge connection illustrated in FIG. 1.

Thus, it will be seen that with the structure of the invention the interconnected elements respectively have the mutually spaced overlapping portions shown in section in FIG. 2 where the left overlapping portion is situated outwardly of the right overlapping portion of the interconnected elements 1. These overlapping portions are respectively formed with coaxial bores passing therethrough, and the outer overlapping portion fixedly carries the pin 3 which extends with clearance coaxially through the bore of the inner overlapping portion. This inner overlapping portion fixedly carries the bushing 2 which coaxially surrounds the pin 3. The inner surface of the outer overlapping portion which surrounds the pin 3 and which is directed toward the bushing 2 is formed with the annular recess which is shown in FIG. 2 defining the shoulder 8 which surrounds the pin 3, and within this annular recess is located the resilient member 11 which forms an inner annular resilient yieldable means directly engaging the pin 3 and surrounding the latter and directly seated in the annular recess of the outer overlapping portion at the shoulder 8 thereof. This yieldable annular resilient means has bonded to its surface which is directed toward the bushing 2 the relatively hard annular means 12 which directly engages the end 7 of the bushing 2 which extends into the annular recess which defines the shoulder 8. Thus, the relatively hard annular means 12 of the seal 6 acts to transmit to the relatively soft yieldable resilient annular means 8 both angular and axial movements of the interconnected elements 1, one with respect to the other, so that in this way the annular resilient means 11 is stressed both torsionally and axially during the relatively small axial and swinging movements of the components 1 with respect to each other.

Figure 3:
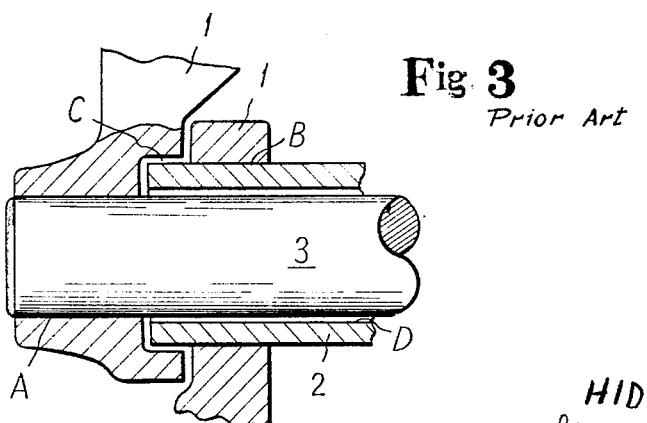
FIG. 3 is a similar view to FIG. 2 but showing another hinge connection in accordance with the prior art.

FIG. 3 illustrates a similar hinge connection in accordance with the prior art referred to hereinbefore for comparing with the embodiment in accordance with this invention. A link 1 is secured to a pin 3 at A and another link 1 is secured to a bushing 2 at B. A clearance C is provided between the first-named link 1 and the bushing 2 and another clearance D is provided between the bushing 2 and the pin 3. These clearances suffer abrasion.

While a particular embodiment of the invention has been illustrated and described, modifications thereof will readily occur to those skilled in the art. It should be understood therefore that the invention is not limited to the particular arrangement disclosed but the appended claims are intended to cover all modifications which do not depart from the true spirit and scope of the invention.

What is claimed as new and desired to be secured by Letters Patent of the United States is:

1. A connecting structure comprising a pair of elements which are required to carry out relatively slight axial and turning movements with respect to each other, said elements respectively having mutually spaced overlapping portions one of which is situated outwardly of the other to form outer and inner overlapping portions, respectively, said overlapping portions of said elements being respectively formed with coaxial bores passing therethrough, an elongated pin fixed to said outer overlapping portion in said bore thereof and extending coaxially with clearance through the bore of said inner overlapping portion, said outer overlapping portion having an annular surface surrounding said pin, directed towards said inner overlapping portion, and formed with an annular recess which surrounds said pin and which defines a shoulder directed towards said inner overlapping portion and surrounding said pin, a brushing fixed to said inner overlapping portion in said bore thereof and coaxially surrounding said pin, the latter extending through said bushing and said bushing extending into said recess and terminating in an end face which is situated within said recess of said outer annular portion which surrounds said pin, said end face of said bushing being spaced from said shoulder, annular, resilient, yieldable means situated in said recess in engagement with said shoulder and directly surrounding and engaging said pin, said yieldable resilient annular means having a surface directed toward said end face of said bushing, and relatively hard annular means engaging said surface of said yieldable resilient annular means and said end face of said bushing for transmitting to said yieldable resilient annular means both axial and turning movements of said elements one with respect to the other so that said yieldable annular resilient means is both torsionally and axially stressed, said yieldable resilient annular means being made of foamed plastic while said relatively hard annular means is made of an abrasion-resistant material.

2. The combination of claim 1 and wherein said resilient yieldable annular means is a foamed urethane rubber and said relatively hard annular means is a hard urethane rubber.

3. The combination of claim 2 and wherein said foamed urethane rubber has a specific gravity on the order of 0.25–0.45, while said hard urethane rubber has a Shore hardness in the range of 85–95.

4. The combination of claim 3 and wherein said relatively hard annular means is bonded to said surface of said yieldable resilient annular means.

References Cited

UNITED STATES PATENTS

| | | | |
|---|---|---|---|
| 2,341,900 | 2/1944 | Boden | 277—92 |
| 2,906,562 | 9/1959 | Burgman | 305—14 X |
| 3,135,128 | 6/1964 | Rudolph | 74—255 |
| 3,206,258 | 9/1965 | Heinrich | 305—11 |
| 3,244,457 | 5/1966 | Ross | 305—11 |
| 3,218,107 | 11/1965 | Reinsma | 305—11 |
| 3,336,086 | 8/1967 | Reinsma | 305—11 |
| 3,341,259 | 9/1967 | Schulz | 305—11 |

RICHARD J. JOHNSON, *Primary Examiner.*